(12) United States Patent
Schneider (10) Patent No.: US 8,707,257 B2
(45) Date of Patent: Apr. 22, 2014

(54) AUTOMATIC OBJECT INSTANTIATION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1562 days.

(21) Appl. No.: 11/946,271

(22) Filed: Nov. 28, 2007

(65) Prior Publication Data
US 2009/0138894 A1 May 28, 2009

(51) Int. Cl.
*G06F 9/44* (2006.01)

(52) U.S. Cl.
USPC .......................................... 717/116; 717/115

(58) Field of Classification Search
CPC ... G06F 9/4423; G06F 9/4426; G06F 9/4428; G06F 9/443; G06F 9/4431
USPC .................................. 717/115, 116
See application file for complete search history.

(56) References Cited

U.S. PATENT DOCUMENTS

| | | | |
|---|---|---|---|
| 5,210,876 A | 5/1993 | Uchida | |
| 6,085,198 A | 7/2000 | Skinner et al. | |
| 6,175,956 B1 | 1/2001 | Hicks et al. | |
| 6,481,006 B1 | 11/2002 | Blandy et al. | |
| 6,523,171 B1 * | 2/2003 | Dupuy et al. | 717/136 |
| 2003/0226132 A1 * | 12/2003 | Tondreau et al. | 717/116 |
| 2004/0040011 A1 | 2/2004 | Bosworth et al. | |
| 2004/0054986 A1 | 3/2004 | Dresselhaus et al. | |
| 2005/0039173 A1 * | 2/2005 | Tondreau et al. | 717/136 |
| 2006/0070028 A1 | 3/2006 | Belov et al. | |
| 2007/0168949 A1 | 7/2007 | Shattuck et al. | |
| 2008/0163167 A1 * | 7/2008 | Buzinov et al. | 717/115 |
| 2008/0307389 A1 * | 12/2008 | Marchant | 717/115 |
| 2008/0307390 A1 * | 12/2008 | Marchant | 717/115 |

OTHER PUBLICATIONS

Cross, D., "Overloading Perl Objects," (Jul. 22, 2003) [ retrieved from http://mag-sol.com/articles/overload.html on Jun. 13, 2011].*
Perl.com, "Jul. 2003 Archives," (Jul. 2003) [retrieved from http://www.perl.com/pub/2003/07/ on Jun. 13, 2011].*
Fra3k, "Code Improvment Guidelines," (Jul. 5, 2005) [retrieved from http://jroller.com/fra3k/entry/code_improvement_guidelines on Jun. 13, 2011].*
Swartz, F., "Commentary: Return Statements and the Single Exit Fantasy" (Oct. 7, 2006) [retrieved from http://www.leepoint.net/JavaBasics/methods/method-commentary/methcom-30-multiple-return.html on Jun. 13, 2011].*
Schwartz, R., "Perl Objects, References & Modules" (Jun. 2003), O'Reilly Media, pp. 88-111,126.*
Wall, L.; Christiansen, T.; Orwant, J., "Programming Perl", 3rd Ed. (Jul. 2000), O'Reilly Media, pp. 1-1072.*
Flanagan, D., "JavaScript: The Definitive Guide," 5th Ed. (Aug. 2006), O'Reilly Media, pp. 106-182.*

(Continued)

*Primary Examiner* — H S Sough
*Assistant Examiner* — Brian W Wathen
(74) *Attorney, Agent, or Firm* — Lowenstein Sandler LLP (57) ABSTRACT

A method and apparatus for converting a function call to a method call. In one embodiment, the method comprises receiving a call on a method and determining whether the call is an object method call. In response to a determination that the call is not the object method call, the method comprises instantiating a new object to convert the call into the object method call.

18 Claims, 6 Drawing Sheets

(56) References Cited

OTHER PUBLICATIONS

Sinclair, R., "Checking If an Object Exists" (Jul. 1, 2003) [retrieved from http://www.codingforums.com/archive/index.php/t-22592.html on Jun. 13, 2011].*

Merriam-Webster's Collegiate Dictionary, $10^{th}$ Edition (1999), Merri-Webster, Inc., pp. 317.*

Crow, Phil, "Symbol Table Manipulation", Perl.com http://www.perl.com/pub/a/2005/03/17/symtables.html, printed from Internet on Feb. 16, 2010, (Mar. 17, 2005), 6 pages.

Red Hat, Inc. U.S. Appl. No. 12/018,378 Non-Final Office Action mailed Sep. 26, 2011.

Stein, L., "CGI.pm-3.25", accessed at http://search.cpan.org/~lds/CGI.pm-3.25/CGI.pm, 62 pages, Sep. 28, 2006.

Wainright, P., "Professional Perl", accessed at http://www.webreference.com/programming/perl/professional/chap7/2/, 2 pages, Mar. 13, 2000.

USPTO, Final Office Action for U.S. Appl. No. 12/018,378, mailed Mar. 9, 2012.

USPTO, Advisory Action for U.S. Appl. No. 12/018,378, mailed May 17, 2012.

USPTO, Notice of Allowance for U.S. Appl. No. 12/018,378 mailed Apr. 8, 2013.

USPTO, Office Action for U.S. Appl. No. 12/018,378 mailed Aug. 27, 2012.

Fowler, M., et al., Refactoring: Improving the Design of Existing Code, Addison-Wesley, 2002, 14 pages, [retrieved on May 5, 2012], Retrieved from the Internet<URL: agilepractice.googlecode.com/files/Refactoring.pdf>.

Butler, T., Class-OOorNO, CPAN, Nov. 3, 2004, 10 pages [retrieved on Aug. 22, 2012], retrieved from the Internet: <URL:http://web.archive.org/web/20041103083603/http://search.cpan.org/~tommy/Class-OOorNO-0.011/00orNO.pd/.

Stein, L., A DNA Sequence Class in Perl, Dr. Dobbs, Jun. 1, 1999, 9 pages, [retrieved on Mar. 28, 2013], Retrieved from the Internet<URL:http://www.drdobbs.com/open-source/a-dna-sequence-class-in-perl/184410964>.

Called as method or subroutine?, Compgroups.net, Jul. 27, 2003, 12 pages [retrived on Mar. 28, 2013], Retrived from the Internet: <URL:http://compgroups.net/comp.lang.perl.misc/called-as-method-or-subroutine/374203>.

* cited by examiner

```
function ObjectifyJavaScript(instance, constructor)
{
    if(instance) return instance;
    return new constructor();
}
```
⟵ 500

```
function MethodJavaScript(arg1,arg2)
{
    this = ObjectifyJavaScript(this, Class);
    // ...
}
```
⟵ 510

AUTOMATIC OBJECT INSTANTIATION

TECHNICAL FIELD

Embodiments of the present invention relate to computer programmability, and more specifically, to a computer system on which subroutines can be called as either functions or methods.

BACKGROUND

Some programming languages are purely procedural, others are purely object-oriented, and some are a hybrid. In a procedural language, such as C, every call is a function call. In an object-oriented language, such as Java, every call is a method call. In a hybrid language, such as Perl, Javascript, or Forth, a call can be either a function call or a method call.

Suppose a software library is written in a hybrid language. The software library includes a plurality of library subroutines, which are written in a style such that they have to be called as methods. This would be the case, for example, if the software library provides some classes and a user is supposed to create objects from the classes and call methods on those objects. If a user has created code that calls the library subroutines with function calls, the code will be successfully compiled but will produce undesirable behaviors at runtime.

Conventionally, the user will have to modify the existing code to ensure that the library subroutines are called as methods in the situation described above. However, in some programming languages (e.g., Perl), the use of method calls generally incurs additional time associated with performing a method lookup. Thus, forbidding function calls will deprive the user of the convenience and speed associated with function calls. Therefore, there is a need to improve software usability and flexibility, such that the above-mentioned problem can be overcome.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for instantiating an object to convert a function call to a method call. In one embodiment, an object instantiator is used to convert a function call into a method call. That is, given an argument list of a method, the object instantiator will determine whether the first parameter of the argument list is an object that allows the method to be called as a method. If the first parameter does not exist, is not an object, or is an object that does not allow the method to be called as a method, the object instantiator constructs (or equivalently, instantiates) an object as the first parameter in the argument list or converts the first parameter into an object. The converted argument list is returned to the method by the object instantiator to allow the method to proceed as if it had been called as a method, irrespective of how it was originally called.

The technique described herein improves software interoperability and flexibility. As mentioned above, object-oriented programming languages (e.g., Java), by design, disallow a method to be called as a function. However, in some hybrid programming languages, such as Perl, Javascript, Forth, etc., a method called as a function may be successfully compiled, but may produce undesirable behavior at runtime. The object instantiator, as described herein, can be used to instantiate an object in a function call and to transform the function call into a method call. The object instantiator will not instantiate an object for a method call that already has an object in a designated object slot. The designated object slot, for Perl and some dialects of Forth that supports object-oriented programming, is the first element of the argument list. For Javascript and some object-oriented Forth dialects, the designated object slot, in which the object resides, refers to a specific variable independent from the argument list. Thus, a method in a software library can call the object instantiator to ensure that the method will function properly. The object instantiator is transparent to the user of the software library. Existing code can utilize the methods provided by the software library, whether the code was written to call the methods as functions or as methods. As a result, software interoperability and flexibility are greatly improved.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "creating", "instantiating", "determining", "returning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM")), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.), etc.

Figure 1:
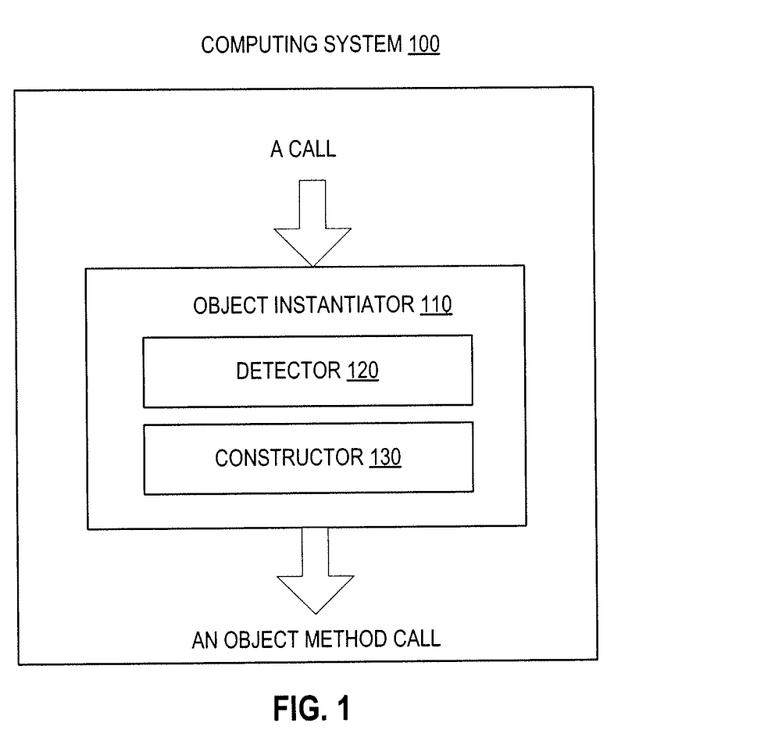
FIG. 1 illustrates a computing system in which an embodiment of an object instantiator is implemented.

FIG. 1 illustrates an embodiment of an object instantiator 110 resident on a computing system 100. The computing system 100 may be, for example, a personal computer (PC), a file server, a mobile phone, a palm-sized computing device, a personal digital assistant (PDA), a networked computing device, and the like. The object instantiator 110 may be implemented as hardware circuit, as computer programs stored in a computer readable storage medium executable by the computing system 100, or a combination of both. An exemplary computing system storing an embodiment of the object instantiator 110 will be described in greater detail with reference to FIG. 6.

In one embodiment, the object instantiator 110 includes a detector 120 and a constructor 130. Upon receiving a call on a method, the detector 120 determines whether the call is a function call. In some scenarios, where a method can be either called as an object (indicating an object method call) or a class (indicating a class method call), the detector 120 detects whether the call is an object method call or a class method call. As will be described in greater detail below, the detector 120 may examine an argument list of the method to determine whether the call is an object method call. If the detector 120 determines that the call is a function call, the constructor 130 creates a new object on which the method can be called, and the argument list of the method is augmented to include the new object. In one embodiment, if the detector 120 determines that the call is a class method call, the constructor 130 may construct a new object from the class and convert a parameter on which the method is called to the new object.

Figure 2:
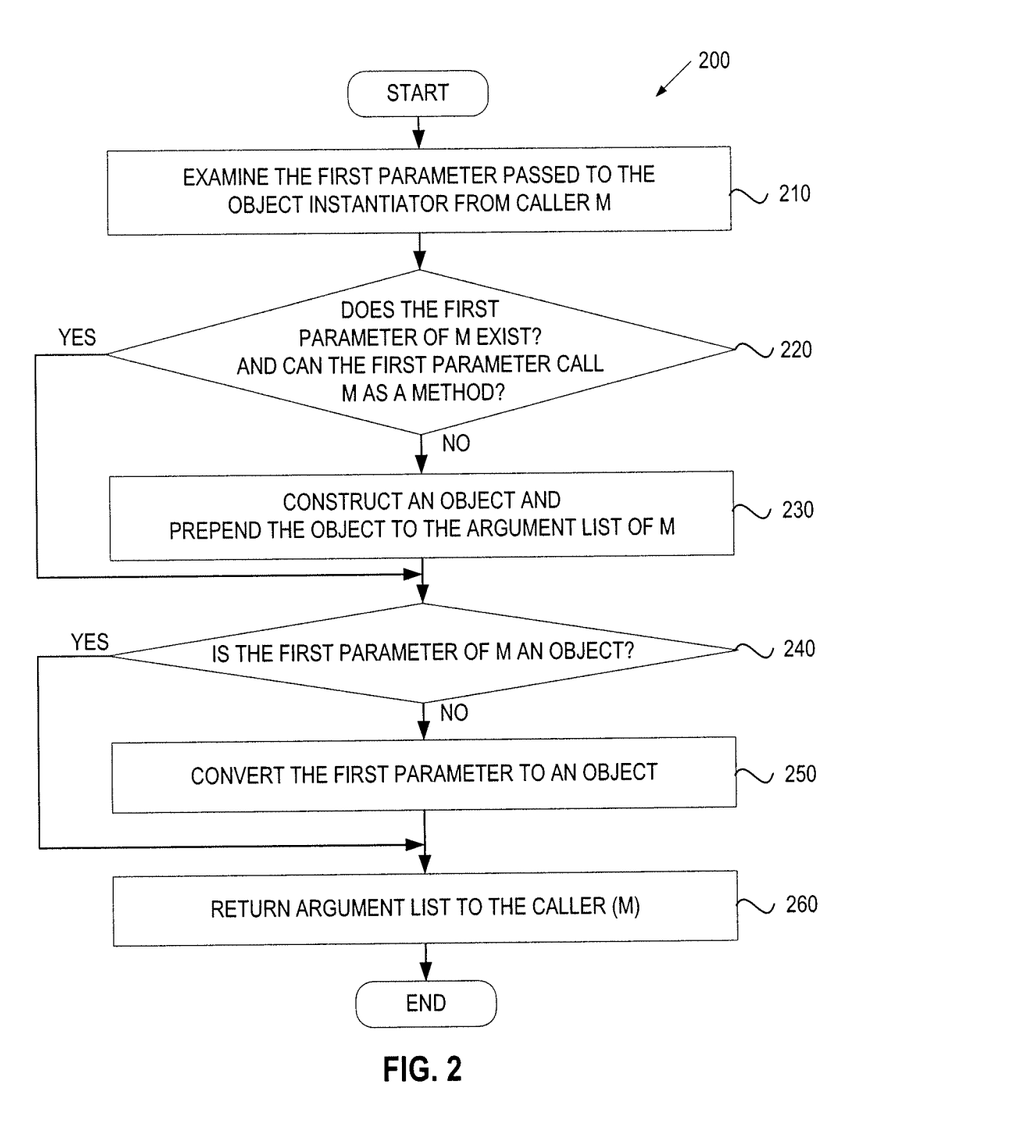
FIG. 2 is a flow diagram of one embodiment of a process for automatic object instantiation.

FIG. 2 illustrates a flow diagram of one embodiment of a process 200 for automatic instantiation of an object in a subroutine call. The process 200 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 200 is performed by the object instantiator 110 on the computing system 100 of FIG. 1. Illustratively, the process 200 is invoked when a method M is called with a subroutine call, and the method M, in turn, calls the object instantiator 110 to ensure that the subroutine call is a method call. For this reason, the method M is referred to herein as a called method or the caller of the process 200. If it is detected that the subroutine call is a function call or a method call on a class as a whole (instead of on an instance of an object in the class), an object in that class is created. The process 200 then converts the subroutine call into a method call that is called on the object (referred herein as an object call). The process 200, if implemented as software, may be implemented in programming languages including, but not limited to, Perl, JavaScript, Forth, interpreted languages, or other hybrid programming languages that are neither purely procedural nor purely object oriented.

Referring to FIG. 2, at block 210, the process 200 begins with the processing logic 626 examining the caller M that initiates the process 200 (that is, M is the caller of the object instantiator 110). In one embodiment, the entire or at least a portion of the argument list of M is passed to the object instantiator 110. At block 220, the process 200 determines whether there is at least one parameter in the argument list, and whether the first parameter in the argument list can call M as a method. A parameter can call M as a method if the parameter is an object or a class. If there is nothing in the argument list, or if the first parameter cannot call M as a method, it is an indication that M is being called with a function call. Thus, at block 230, the process 200 creates a new object and prepends the object to (that is, adding the object to the front of) the argument list of M. If, at block 220, it is determined that the argument list of M has at least one parameter and the first parameter can call M as a method, the process 200 proceeds to block 240 to determine whether the first parameter is an object. Some programming languages, e.g., Perl, make no distinction between a class and an object when they resolve method calls. Thus, it is possible that the first parameter is a class (indicating a class call) instead of an object (indicating an object call). A class method can alter the state of the class as a whole, while an object method typically will only alter the state of the object it is provided. Class methods are ordinarily used to provide access to constants or to interact with class-wide configuration. Object methods are ordinarily used to interact with the state of a particular object. In some programming languages, such as Perl, where a method can be called on a class or an object, it is normally permissible to call a class method as an object method, but calling an object method as a class method can lead to exceptions. Thus, in the following operations, the process 200 ensures that the method M is called as an object method regardless of whether M is designed to be called as a class method or an object method.

Proceeding to block 240, if the first parameter is an object, it is an indication that M can be called as an object method. Thus, at block 260, the process 200 returns the argument list to M. However, if the first parameter is not an object (e.g., a class), the first parameter is converted into an object at block 250 and the argument list is returned at block 260. In one embodiment where the first parameter is a class, the process 200 may instantiate a new object from the class and use that new object as the first parameter at block 250. The process 200 is completed when the argument list of M is returned back to the caller M.

It is noted that a constructed object can be reused where the call on a method is repeated. For example, the process 200 may be executed in a loop, in which the method M is repeatedly called with a function call. In this scenario, the same object instantiated at blocks 230 or 250 may be reused throughout the loop. Thus, the insignificant overhead incurred by executing process 200 can be further reduced.

Figure 3:
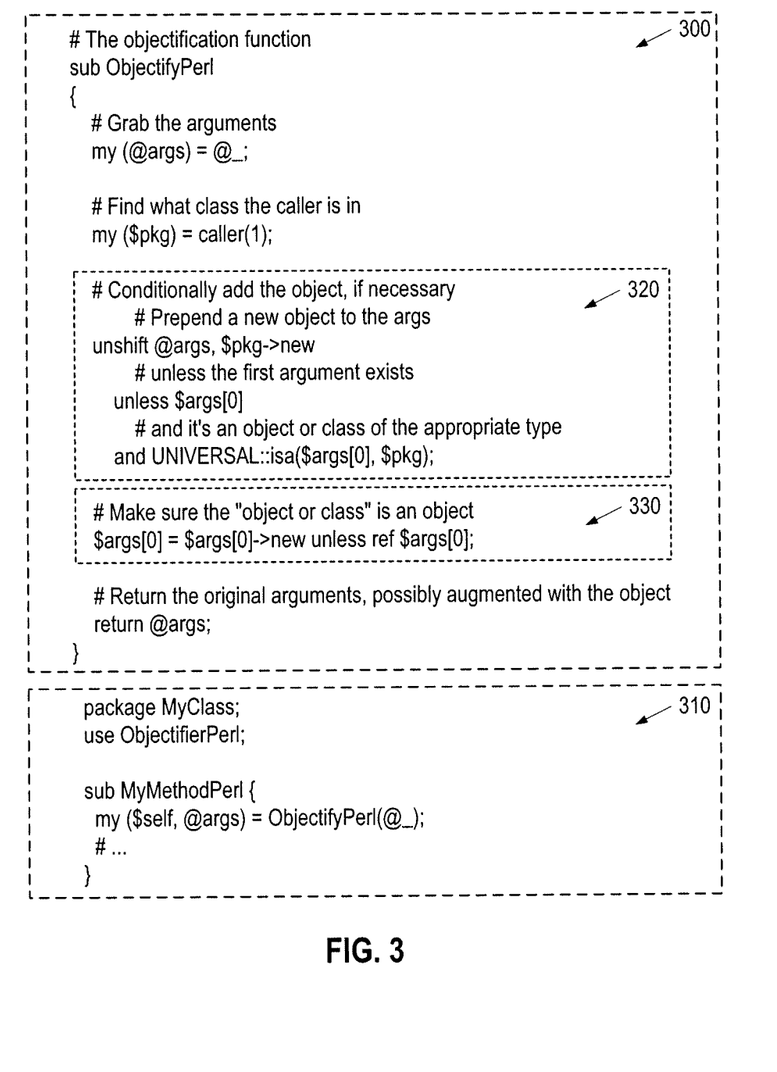
FIG. 3 is an example of a Perl program that implements the process of FIG. 2.

FIG. 3 illustrates an example of a program written in Perl for implementing the process 200 of FIG. 2. A Perl subroutine ObjectifyPerl 300 performs the function of an embodiment of the object instantiator 110 of FIG. 1. A method MyMethodPerl 310 calls ObjectifyPerl 300 to ensure that it (MyMethodPerl) is called as an object method. In this embodiment, MyMethodPerl 310 represents the method M of process 200, a code segment 320 implements blocks 220 and 230 of process 200, and a code segment 330 implements blocks 240 and 250 of process 200. ObjectifyPerl 300 handles a situation in which the first argument of a method M happens to be an object of a wrong class that has its own method M. ObjectifyPerl 300 handles another situation in which the method being called has not been defined at the point when it is called, but has been resolved by the autoload function provided by Perl. ObjectifyPerl 300 and MyMethodPerl 310 can be part of a software library in which a plurality of methods (including MyMethodPerl 310) are provided. With ObjectifyPerl 300, users of the software library may call the methods in the library with either function calls or method calls. This feature greatly improves software interoperability.

Figure 4:
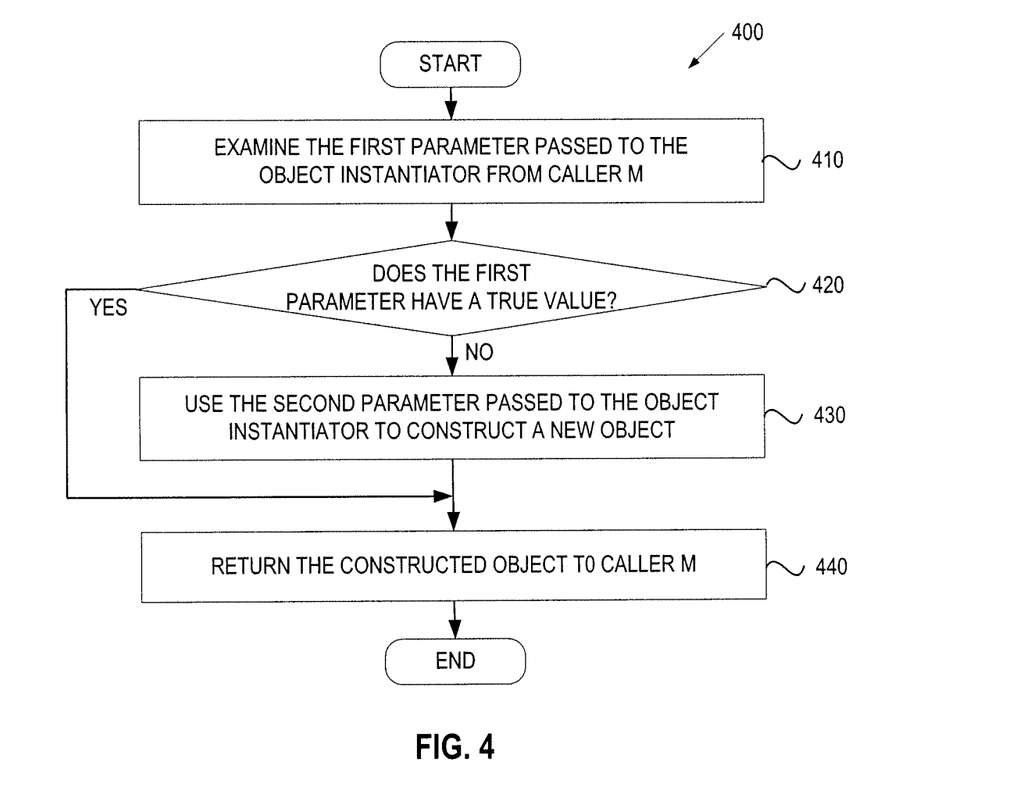
FIG. 4 is a flow diagram of another embodiment of a process for automatic object instantiation.

FIG. 4 illustrates a flow diagram of another embodiment of a process 400 for automatic instantiation of an object in a subroutine call. The process 400 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 400 is performed by the object instantiator 110 on the computing system 100 of FIG. 1. The process 400, if implemented as software, may be implemented in programming languages including, but not limited to, Perl, JavaScript, Forth, interpreted languages, or other hybrid programming languages that are neither purely procedural nor purely object oriented.

Referring to FIG. 4, at block 410, the process 400 begins with the processing logic 626 examining the first parameter passed to the process 400 from the caller M. At block 420, it is determined whether the first parameter has a true value. If it has a true value, the process 400 proceeds to block 440 to return the first parameter. If the first parameter does not have a true value, at block 430, the process 400 uses the second parameter passed from the caller M to construct a new object. At block 440, the constructed object is returned to the caller M.

Figure 5:
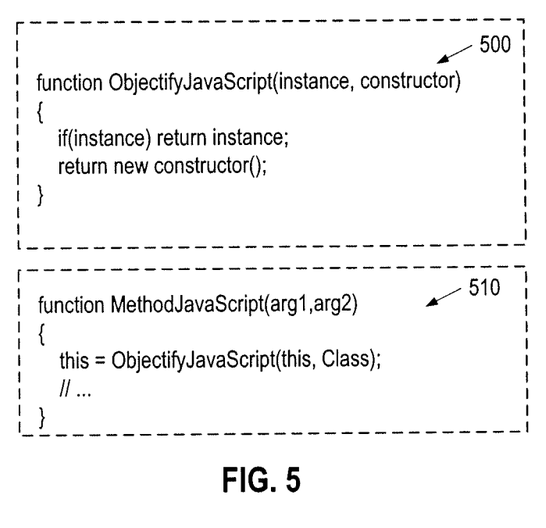
FIG. 5 is an example of a Javascript program that implements the process of FIG. 4.

FIG. 5 illustrates an example of a program written in Javascript for implementing the process 400 of FIG. 4. A Javascript subroutine ObjectifyJavaScript 500 performs the function of another embodiment of the object instantiator 110 of FIG. 1. A method MethodJavaScript 510 calls the objectify subroutine 500 to ensure that it (MethodJavaScript) is called as an object method. The implementation of the object instantiator 110 in JavaScript is much easier than the implementation in Perl, chiefly because JavaScript has a special object ("this" in MethodJavaScript 510), which can be easily distinguished from the rest of the parameters. The special object "this" holds the object on which the method is called. Thus, if the special object "this" exists, it means that MethodJavaScript 510 is called with an object method. As "this" is an object by design of the language, it is unnecessary for ObjectifyJavaScript 500 to perform the operations of blocks 240 and 250 of FIG. 2 to convert a class method call into an object method call. Further, as "this" holds the object on which the method is called by design of the language, it is unnecessary to test whether the first parameter can call MethodJavaScript 510 as a method at block 220. In the embodiment shown in FIG. 5, ObjectifyJavaScript 500 contains two lines of code. The first line of code determines whether the special object "this" exists. If it does not exist, in the second line of code, ObjectifyJavaScript 500 constructs a new object. Similar to the embodiment described above, the use of ObjectifyJavaScript 500 also greatly improves software interoperability.

Figure 6:
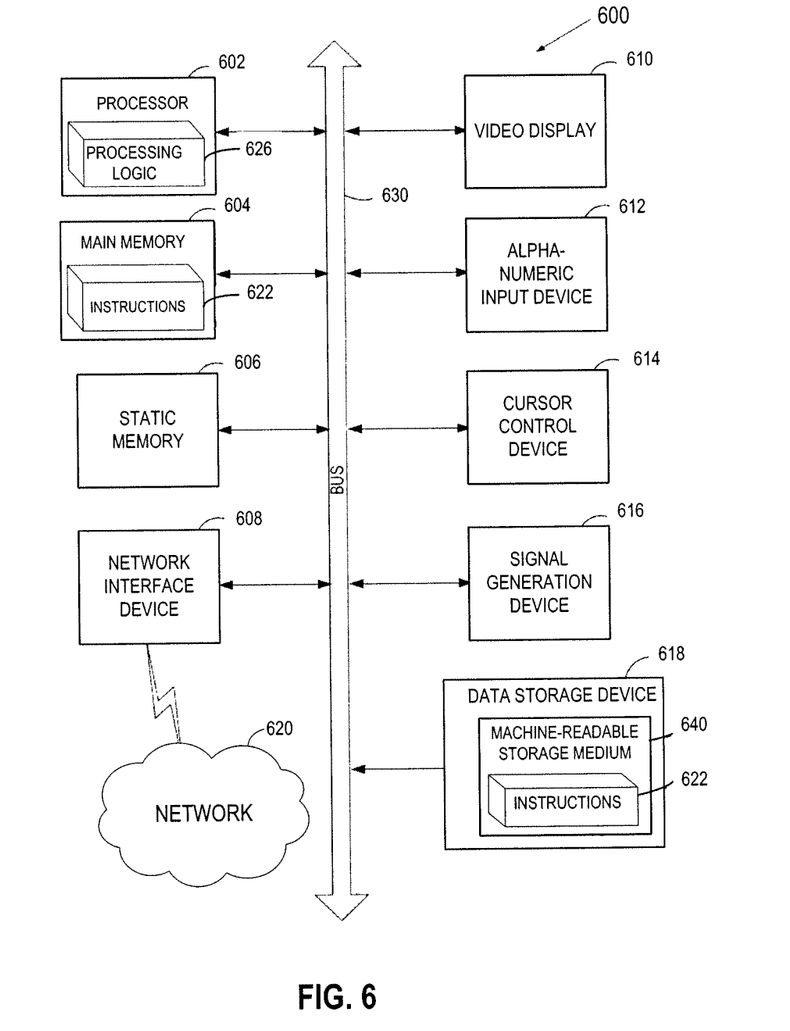
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices, such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices, such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically computer-readable storage medium) 640 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 640 may also be used to store the object instantiator 110 of FIG. 1, and/or a software library containing methods that call the object instantiator 110. While the machine-readable storage medium 640 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for automatic object instantiation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    invoking, by a method routine that is executable by a processing device, an object instantiator that is stored in memory communicably coupled to the processing device, the method routine called with a subroutine call executable by the processing device;
    receiving, by the object instantiator from the method routine, a first parameter of an argument list of the method routine;
    when the first parameter is not an object or a class, prepending a new object to the argument list of the method routine, the new object to be the first parameter in the argument list;
    when the first parameter is a class, converting the first parameter from a class to an object; and
    returning, by the object instantiator, the augmented argument list to the method routine so that the method routine is called as an object method call by the subroutine call.

2. The method of claim 1, further comprising:
    receiving at least a portion of the argument list of the method routine.

3. The method of claim 1, further comprising when the argument list does not comprise any parameters, prepending the new object to the argument list.

4. The method of claim 1, wherein the new object is reused when a call on the method routine is repeated.

5. The method of claim 1, wherein the method routine is implemented in Perl, Javascript, or Forth.

6. The method of claim 1, further comprising:
    incorporating the method routine into a software library; and
    providing the software library to users to allow the method routine to be called as a function.

7. The method of claim 1, further comprising determining whether a special object exists in the method routine, the special object holding an object on which the method routine is called.

8. A system comprising:
    a processing device;
    a data storage device communicably coupled to the processing device, the data storage device to store a software library comprising a method called with a subroutine call executable by the processing device; and
    an object instantiator executable from the data storage device by the processing device, the object instantiator invoked by the called method and to:
    receive, from the called method, a first parameter of an argument list of the called method;
    when the first parameter is not an object or a class, prepend a new object to the argument list of the called method, the new object to be the first parameter in the argument list;
    when the first parameter is a class, convert the first parameter from a class to an object; and
    return the augmented argument list to the called method so that the called method is called as an object method call by the subroutine call.

9. The system of claim 8, wherein the processing device comprises a constructor to construct the new object when it is determined that the call on the called method is not an object method call.

10. The system of claim 8, wherein the processing device comprises a detector to determine whether the argument list comprises at least one parameter, and whether the first parameter of the at least one parameter is an object.

11. The system of claim 10, wherein the called method is implemented in Perl, Javascript, or Forth.

12. A non-transitory computer-readable storage medium including instructions that, when accessed by a processing device, cause the processing device to perform operations comprising:
    invoking, by a method routine that is executable by the processing device, an object instantiator that is stored in memory communicably coupled to the processing device, the method routine called with a subroutine call executable by the processing device;
    receiving, by the object instantiator from the method routine, a first parameter of an argument list of the method routine;
    when the first parameter is not an object or a class, prepending a new object to the argument list of the method routine, the new object to be the first parameter in the argument list;
    when the first parameter is a class, converting the first parameter from a class to an object; and returning, by the object instantiator, the augmented argument list to the method routine so that the method routine is called as an object method call by the subroutine call.

13. The non-transitory computer-readable storage medium of claim 12, wherein the operations further comprise:
receiving at least a portion of the argument list of the method routine.

14. The non-transitory computer-readable storage medium of claim 12, wherein the operations further comprise when the argument list does not comprise any parameters, prepending the new object to the argument list.

15. The non-transitory computer-readable storage medium of claim 12, wherein the new object is reused when a call on the method routine is repeated.

16. The non-transitory computer-readable storage medium of claim 12, wherein the method routine is implemented in Perl, Javascript, or Forth.

17. The non-transitory computer-readable storage medium of claim 12, wherein the operations further comprise:
incorporating the method routine into a software library; and
providing the software library to users to allow the method routine to be called as a function.

18. The non-transitory computer-readable storage medium of claim 12, wherein the operations further comprise determining whether a special object exists in the method routine, the special object holding an object on which the method routine is called.

\* \* \* \* \*